(12) United States Patent
Masuda et al.

(10) Patent No.: US 11,640,067 B2
(45) Date of Patent: May 2, 2023

(54) LASER PROJECTING DEVICE AND LIGHT-COMBINING LENS

(71) Applicant: MEGA1 COMPANY LTD., New Taipei (TW)

(72) Inventors: Makoto Masuda, New Taipei (TW); Han-Chiang Wu, New Taipei (TW)

(73) Assignee: MEGA1 COMPANY LTD., New Taipei (TW)

( * ) Notice: Subject to any disclaimer, the term of this patent is extended or adjusted under 35 U.S.C. 154(b) by 0 days.

(21) Appl. No.: 17/547,426

(22) Filed: Dec. 10, 2021

(65) Prior Publication Data

US 2022/0099986 A1 Mar. 31, 2022

Related U.S. Application Data

(62) Division of application No. 17/004,283, filed on Aug. 27, 2020, now Pat. No. 11,237,401.

(Continued)

(51) Int. Cl.
*G02B 27/10* (2006.01)
*F21V 17/10* (2006.01)
(Continued)

(52) U.S. Cl.
CPC .......... *G02B 27/1006* (2013.01); *F21V 5/007* (2013.01); *F21V 17/10* (2013.01);
(Continued)

(58) Field of Classification Search
CPC .......... G03B 21/20; G03B 21/2013; G02B 19/0028; G02B 19/0057; G02B 27/0905;
(Continued)

(56) References Cited

U.S. PATENT DOCUMENTS 8,625,989 B2 * 1/2014 Du .......... H01S 5/4025
398/43
8,995,845 B2 * 3/2015 Du .......... G02B 6/4215
398/79

(Continued)

*Primary Examiner* — Arman B Fallahkhair
(74) *Attorney, Agent, or Firm* — Li & Cai Intellectual Property (USA) Office

(57) ABSTRACT

A laser projecting device and a light-combining lens are provided. The light-combining lens is a one-piece structure, and has a difference of refractive indexes less than 0.2. The light-combining lens includes collimation surfaces, reflection surfaces, and a light emergent surface. Each collimation surface defines a collimation path inside the light-combining lens. The reflection surfaces respectively located at the collimation paths are parallel to each other and arranged along an arrangement direction. The light emergent surface is located at the arrangement direction. Each reflection surface and the corresponding collimation path have an acute angle therebetween to define a reflection path. The reflection paths are overlapped in the light-combining lens to define a light-combining path. The light combining path passes through at least one of the reflection surfaces that allows light to pass therethrough along the light-combining path, and passes through the light-combining lens from the light emergent surface.

20 Claims, 6 Drawing Sheets

Related U.S. Application Data

(60) Provisional application No. 62/899,225, filed on Sep. 12, 2019.

(51) Int. Cl.
*F21V 5/00* (2018.01)
*G03B 21/20* (2006.01)
*G02B 19/00* (2006.01)
*G02B 27/09* (2006.01)
*F21Y 113/10* (2016.01)
*F21Y 115/30* (2016.01)

(52) U.S. Cl.
CPC ..... *G02B 19/0028* (2013.01); *G02B 19/0057* (2013.01); *G02B 27/0905* (2013.01); *G02B 27/10* (2013.01); *G02B 27/102* (2013.01); *G03B 21/20* (2013.01); *G03B 21/2013* (2013.01); *F21Y 2113/10* (2016.08); *F21Y 2115/30* (2016.08)

(58) Field of Classification Search
CPC .. G02B 27/10; G02B 27/102; G02B 27/1006; F21V 5/007; F21V 17/10
See application file for complete search history.

(56) References Cited

U.S. PATENT DOCUMENTS

| | | | |
|---|---|---|---|
| 9,735,550 B2 * | 8/2017 | Takahashi | H04N 9/3152 |
| 11,237,401 B2 * | 2/2022 | Masuda | G02B 19/0057 |

* cited by examiner

LASER PROJECTING DEVICE AND LIGHT-COMBINING LENS

CROSS-REFERENCE TO RELATED PATENT APPLICATION

This application claims priority to the U.S. Provisional Patent Application Ser. No. 62/899,225 filed on Sep. 12, 2019, which application is incorporated herein by reference in its entirety.

The present application is a divisional application of application Ser. No. 17/004,283, filed on Aug. 27, 2020 and entitled "LASER PROJECTING DEVICE AND LIGHT-COMBINING LENS," now allowed. Moreover, this divisional application rejoins claims based on Species of FIG. 1 and FIG. 2, according to the Restriction Requirement dated Aug. 20, 2021, augmented with new claims supported by original specification.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a lens, and more particularly to a laser projecting device and a light-combining lens.

BACKGROUND OF THE DISCLOSURE

A conventional light-combining assembly includes a plurality of optical members spaced apart from each other and arranged in a chamber, and there is air between any two of the optical members. As such, the conventional light-combining assembly has a large volume. Moreover, when the conventional light-combining assembly is used in a light-combining process for combining lights, the lights would travel in an environment having extremely different refractive indices, thereby causing the efficiency and the accuracy of the light-combining process to be easily affected.

SUMMARY OF THE DISCLOSURE

In response to the above-referenced technical inadequacies, the present disclosure provides a laser projecting device and a light-combining lens to effectively improve on issues associated with conventional light-combining assemblies.

In one aspect, the present disclosure provides a laser projecting device, which includes a light-combining lens and a laser module. The light-combining lens is formed as a one-piece structure and has a difference of refractive indexes therein that is less than 0.2. The light-combining lens includes a front portion, a rear portion, and an expanding portion. The front portion includes a front collimation surface and a front reflection surface. The front collimation surface defines a front collimation path inside of the front portion. The front reflection surface is located at the front collimation path. The front collimation path and the front reflection surface have an acute angle therebetween and jointly define a front reflection path. The rear portion includes a rear collimation surface, a rear reflection surface, and a light emergent surface. The rear collimation surface defines a rear collimation path inside of the rear portion. The rear reflection surface is located at the rear collimation path. The rear collimation path and the rear reflection surface have an acute angle therebetween and jointly define a rear reflection path. The rear reflection surface allows light to pass therethrough from one side of the rear reflection surface that is opposite to the rear reflection path. The light emergent surface is arranged on a surface of the rear portion away from the front reflection surface. The expanding portion is disposed between the front portion and the rear portion along an arrangement direction. The expanding portion includes an expanding collimation surface and an expanding reflection surface. The expanding collimation surface defines an expanding collimation path inside of the expanding portion. The expanding reflection surface is located at the expanding collimation path. The expanding collimation path and the expanding reflection surface have an acute angle therebetween and jointly define an expanding reflection path. The expanding reflection surface allows light to pass therethrough from one side of the expanding reflection surface that is opposite to the expanding reflection path. The front reflection path, the expanding reflection path, and the rear reflection path are overlapped with each other in the light-combining lens so as to jointly define a light-combining path that extends outside of the light-combining lens from the light emergent surface. The laser module corresponds in position to the light-combining lens, and includes a substrate and three laser emitters. The three laser emitters are mounted on the substrate and respectively face toward the front collimation surface, the rear collimation surface, and the expanding collimation surface. The three laser emitters are configured to respectively emit lights traveling along the front collimation path, the expanding collimation path, the rear collimation path, and the light-combining path. The light-combining lens and each of the three laser emitters have a separation distance therebetween, the separation distances corresponding to the three laser emitters are different from each other, and any one of the separation distances is smaller than a focal length of any one of the front collimation surface, the rear collimation surface, and the expanding collimation surface.

In another aspect, the present disclosure provides a light-combining lens, which is formed as a one-piece structure and has a difference of refractive indexes therein that is less than 0.2. The light-combining lens includes a front portion and a rear portion. The front portion includes a front collimation surface and a front reflection surface. The front collimation surface defines a front collimation path inside of the front portion. The front reflection surface is located at the front collimation path. The front collimation path and the front reflection surface have an acute angle therebetween and jointly define a front reflection path. The rear portion and the front portion are arranged along an arrangement direction, and the rear portion includes a rear collimation surface, a rear reflection surface, and a light emergent surface. The rear collimation surface defines a rear collimation path inside of the rear portion. The rear reflection surface is located at the rear collimation path. The rear collimation path and the rear reflection surface have an acute angle therebetween and jointly define a rear reflection path. The rear reflection surface allows light to pass therethrough from one side of the rear reflection surface that is opposite to the rear reflection path. The light emergent surface is arranged on a surface of the rear portion away from the front reflection surface. The front reflection path and the rear reflection path are overlapped with each other in the light-combining lens so as to jointly define a light-combining path that extends outside of the light-combining lens from the light emergent surface.

In yet another aspect, the present disclosure provides a light-combining lens, which is formed as a one-piece structure and has a difference of refractive indexes therein that is less than 0.2. The light-combining lens includes a plurality of collimation surfaces, a plurality of reflection surfaces, and a light emergent surface. Each of the collimation surfaces defines a collimation path inside of the light-combining lens. The reflection surfaces are respectively located at the collimation paths. The reflection surfaces are arranged along an arrangement direction and are parallel to each other. Each of the reflection surfaces and one of the collimation paths corresponding thereto have an acute angle therebetween and jointly define a reflection path. The reflection paths are overlapped with each other in the light-combining lens so as to jointly define a light-combining path. The light-combining path passes through at least one of the reflection surfaces that allows light to pass therethrough by traveling along the light-combining path. The light emergent surface is located at the arrangement direction. The light-combining path extends outside of the light-combining lens from the light emergent surface.

Therefore, as the light-combining lens in the present disclosure is a one-piece structure and has a difference of refractive indexes therein that is less than 0.2, when the light-combining lens is applied to a light-combining process for combining lights, the lights would travel in a medium (i.e., the light-combining lens) having a difference of refractive indexes therein that is less than 0.2, thereby effectively increasing the efficiency and the accuracy of the light-combining process. Moreover, the light-combining lens that is formed as a one-piece structure is effectively reduced in its overall volume, and is therefore capable of being applied to the laser module that is miniaturized.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
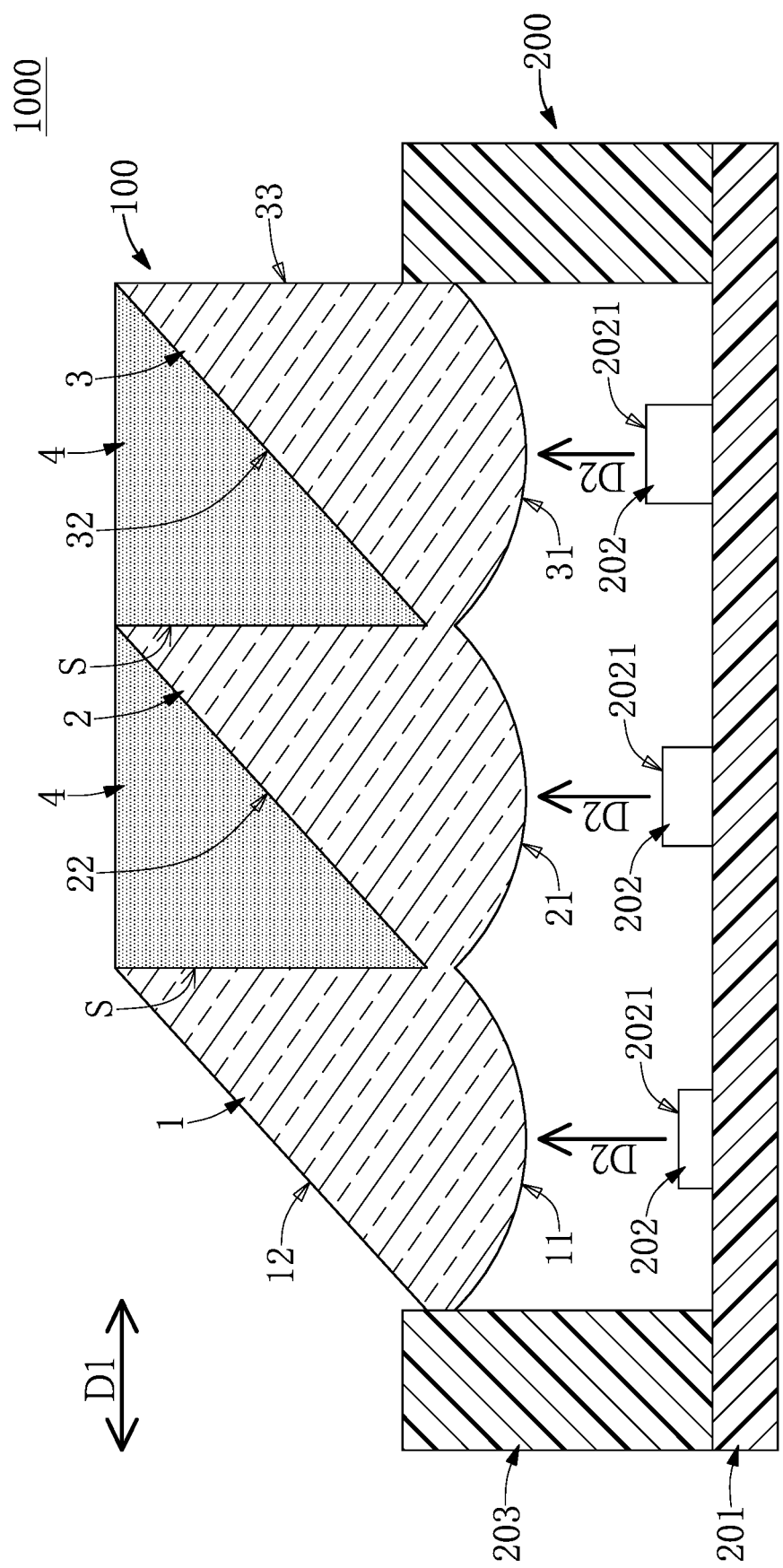
FIG. 1 is a schematic view of a laser projecting device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
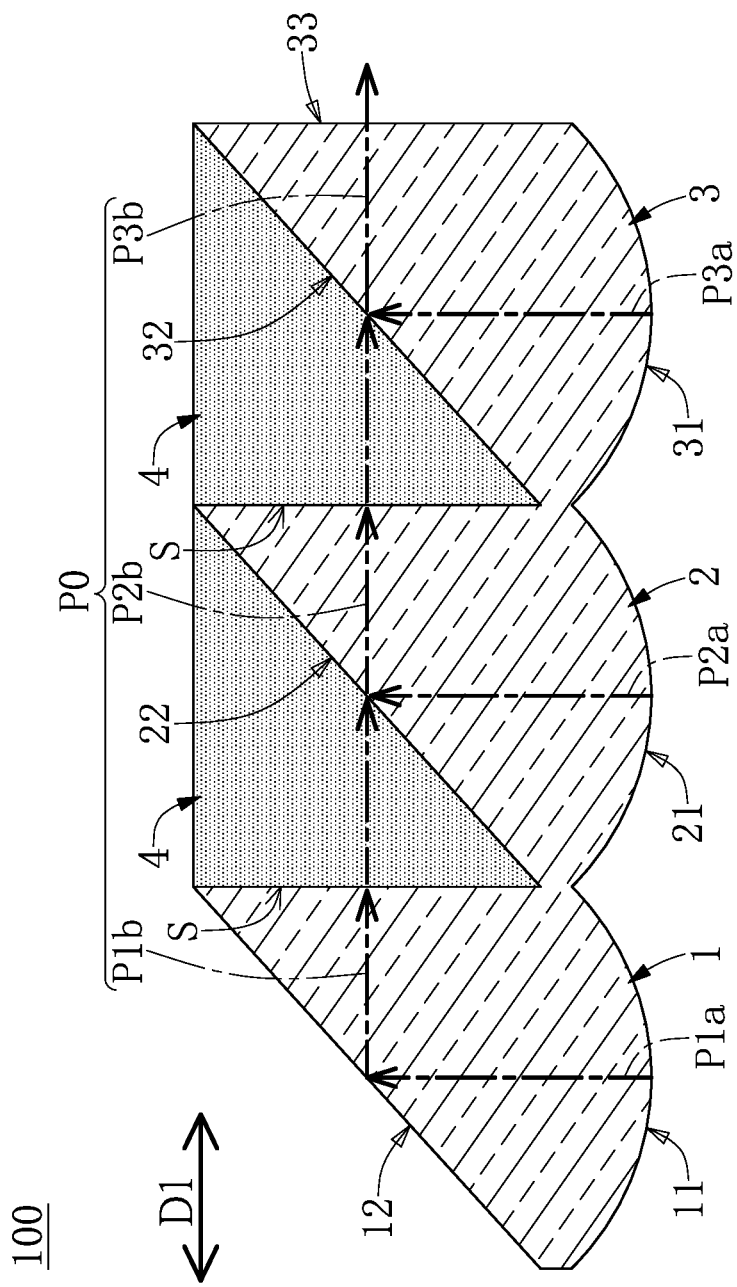
FIG. 2 is a schematic view of a light-combining lens of the laser projecting device according to the first embodiment of the present disclosure.

Referring to FIG. 1 and FIG. 2, a first embodiment of the present disclosure provides a laser projecting device 1000 that can be applied to a laser beam scanning (LBS) apparatus, but the present disclosure is not limited thereto. The laser projecting device 1000 includes a light-combining lens 100 and a laser module 200 that corresponds in position to the light-combining lens 100.

It should be noted that the light-combining lens 100 in the present embodiment is described in cooperation with the laser module 200, but the present disclosure is not limited thereto. For example, in other embodiments of the present disclosure, the light-combining lens 100 can be independently used (e.g., sold) or can be used in cooperation with other components (e.g., any light emitting module other than the laser module 200). The following description describes the structure and connection relationship of each of the light-combining lens 100 and the laser module 200.

The light-combining lens 100 is formed as a one-piece structure and has a difference of refractive indexes therein that is less than 0.2. In other words, any light-combining assembly including optical members spaced apart from each other by air is different from the light-combining lens 100 of the present embodiment. Or, any light-combining assembly having a difference of refractive indexes more than 0.2 is different from the light-combining lens 100 of the present embodiment.

The light-combining lens 100 in the present embodiment includes a front portion 1, at least one expanding portion 2, a rear portion 3, and an optical colloid 4. The front portion 1, the at least one expanding portion 2, and the rear portion 3 are arranged along an arrangement direction D1. In other words, the at least one expanding portion 2 is disposed between the front portion 1 and the rear portion 3.

Moreover, the quantity of the at least one expanding portion 2 in the present embodiment is one, but the present disclosure is not limited thereto. For example, in other embodiments of the present disclosure, the light-combining lens 100 can be provided without the expanding portion 2 and/or the optical colloid 4; or, the quantity of the at least one expanding portion 2 can be more than one.

The front portion 1, the expanding portion 2, and the rear portion 3 in the present embodiment are made of the same material (e.g., a glass or an optical plastic), and are integrally connected to each other so as to be formed as a one-piece structure. For example, the front portion 1, the expanding portion 2, and the rear portion 3 can be formed by directly processing a piece of glass or optical plastic, thereby effectively reducing a tolerance in a combining process of the front portion 1, the expanding portion 2, and the rear portion 3, but the present disclosure is not limited thereto. The front portion 1, the expanding portion 2, and the rear portion 3 have a same refractive index that is defined as a first refractive index, and the optical colloid 4 has a second refractive index. Moreover, a difference between the first refractive index and the second refractive index is less than 0.2.

Furthermore, in order to clearly describe the structure of the light-combining lens 100, the following description describes the structure of each of the front portion 1, the expanding portion 2, and the rear portion 3, and then describes the connection relationship of the front portion 1, the expanding portion 2, and the rear portion 3.

In the present embodiment, (an outer surface of) the front portion 1 includes a front collimation surface 11 and a front reflection surface 12. The front collimation surface 11 in the present embodiment is a convex surface and defines a front collimation path P1a inside of the front portion 1. The front reflection surface 12 is located at the front collimation path P1a, and the front collimation path P1a and the front reflection surface 12 have a first acute angle therebetween and jointly define a front reflection path P1b.

Specifically, the front collimation surface 11 can be used to guide light outside of the light-combining lens 100 to travel toward the front reflection surface 12 by penetrating into the front portion 1 along the front collimation path P1a, such that the light can travel along the front reflection path P1b by being reflected from the front reflection surface 12. Moreover, the front reflection surface 12 does not allow any light to pass therethrough from one side of the front reflection surface 12 (e.g., a left side of the front reflection surface 12 shown in FIG. 2) that is opposite to the front reflection path P1b.

In the present embodiment, (an outer surface of) the expanding portion 2 includes an expanding collimation surface 21 and an expanding reflection surface 22. The expanding collimation surface 21 in the present embodiment is a convex surface and defines an expanding collimation path P2a inside of the expanding portion 2. The expanding reflection surface 22 is located at the expanding collimation path P2a, and the expanding collimation path P2a and the expanding reflection surface 22 have a second acute angle therebetween and jointly define an expanding reflection path P2b.

Specifically, the expanding collimation surface 21 can be used to guide light outside of the light-combining lens 100 to travel toward the expanding reflection surface 22 by penetrating into the expanding portion 2 along the expanding collimation path P2a, such that the light can travel along the expanding reflection path P2b by being reflected from the expanding reflection surface 22. Moreover, the expanding reflection surface 22 allows light to pass therethrough from one side of the expanding reflection surface 22 (e.g., a left side of the expanding reflection surface 22 shown in FIG. 2) that is opposite to the expanding reflection path P2b. In other words, the light that travels along the front reflection path P1b, after passing through the front portion 1, can pass through the expanding reflection surface 22 to travel along the expanding reflection path P2b.

In the present embodiment, (an outer surface of) the rear portion 3 includes a rear collimation surface 31, a rear reflection surface 32, and a light emergent surface 33. The rear collimation surface 31 in the present embodiment is a convex surface and defines a rear collimation path P3a inside of the rear portion 3. The rear reflection surface 32 is located at the rear collimation path P3a, and the rear collimation path P3a and the rear reflection surface 32 have a third acute angle therebetween and jointly define a rear reflection path P3b. The light emergent surface 33 is arranged on a surface of the rear portion 3 away from the front reflection surface 12.

Specifically, the rear collimation surface 31 can be used to guide light outside of the light-combining lens 100 to travel toward the rear reflection surface 32 by penetrating into the rear portion 3 along the rear collimation path P3a, such that the light can travel along the rear reflection path P3b by being reflected from the rear reflection surface 32. Moreover, the rear reflection surface 32 allows light to pass therethrough from one side of the rear reflection surface 32 (e.g., a left side of the rear reflection surface 32 shown in FIG. 2) that is opposite to the rear reflection path P3b. In other words, the light that travels along the front reflection path P1b and the expanding reflection surface P2b, after passing through the expanding portion 2, can pass through the rear reflection surface 32 to travel along the rear reflection path P3b.

The above description describes the structure of each of the front portion 1, the expanding portion 2, and the rear portion 3, and the following description describes the connection relationship of the front portion 1, the expanding portion 2, and the rear portion 3.

The front collimation surface 11, the expanding collimation surface 21, and the rear collimation surface 31 in the present embodiment have a same focal length, and the focal length of any one of the front collimation surface 11, the expanding collimation surface 21, and the rear collimation surface 31 is preferably within a range of 1.7 mm to 4.5 mm, but the present disclosure is not limited thereto. For example, in other embodiments of the present disclosure, any two of the front collimation surface 11, the expanding collimation surface 21, and the rear collimation surface 31 can have different focal lengths.

Moreover, the front collimation surface 11, the expanding collimation surface 21, and the rear collimation surface 31 in the present embodiment have a same tangent plane. In other words, any two of the front collimation surface 11, the expanding collimation surface 21, and the rear collimation surface 31 do not have any step difference in an incident direction D2 perpendicular to the arrangement direction D1.

The front reflection surface 12, the expanding reflection surface 22, and the rear reflection surface 32 are arranged in one row along the arrangement direction D1 and are parallel to each other. The first acute angle, the second acute angle, and the third acute angle in the present embodiment have the same value (e.g., 45 degrees) that can be adjusted or changed according to design requirements, and the present disclosure is not limited thereto. For example, in other embodiments of the present disclosure, the first acute angle, the second acute angle, and the third acute angle can be of different values.

Specifically, the front reflection path P1*b*, the expanding reflection path P2*b*, and the rear reflection path P3*b* are overlapped with each other in the light-combining lens 100 (i.e., the expanding reflection path P2*b* defined by the at least one expanding portion 2 is overlapped with the front reflection path P1*b* and the rear reflection path P3*b*) so as to jointly define a light-combining path P0 that extends outside of the light-combining lens 100 from the light emergent surface 33.

In other embodiments of the present disclosure that do not include the expanding portion 2, the front reflection path P1*b* and the rear reflection path P3*b* are overlapped with each other in the light-combining lens 100, so as to jointly define the light-combining path P0 that extends outside of the light-combining lens 100 from the light emergent surface 33.

Moreover, in the light-combining lens 100 of the present embodiment, parts of the front collimation surface 11, the expanding collimation surface 21, and the rear collimation surface 31 adjacent to each other are connected to each other, so that the front portion 1, the expanding portion 2, and the rear portion 3 can have a plurality of slots S arranged in regions thereof through which the light-combining path P0 passes, but the present disclosure is not limited thereto.

For example, in other embodiments of the present disclosure, a peripheral part of the front collimation surface 11 can be connected to a peripheral part of the expanding reflection surface 22, and a peripheral part of the expanding collimation surface 21 can be connected to a peripheral part of the rear reflection surface 32, so that any two of the front collimation surface 11, the expanding collimation surface 21, and the rear collimation surface 31 have a step difference therebetween.

In addition, the optical colloid 4 in the present embodiment is filled in the slots S, and the light-combining path P0 is located in the front portion 1, the expanding portion 2, the rear portion 3, and the optical colloid 4. Accordingly, when the light-combining lens 100 is applied to a light-combining process for combining lights, the lights would travel in a medium (i.e., the light-combining lens 100) having a difference of refractive indexes therein that is less than 0.2, thereby effectively increasing the efficiency and the accuracy of the light-combining process.

It should be noted that the terms "front" and "rear" used in names of the corresponding components of the present embodiment are defined by the sequence of the light-combining process along the light-combining path P0, so as to distinguish different portions of the light-combining lens 100 from each other. The terms "front" and "rear" are not used to limit the relative position of the corresponding components.

In other words, (an outer surface of) the light-combining lens 100 includes a plurality of collimation surfaces 11, 21, 31, a plurality of reflection surfaces 12, 22, 32, and a light emergent surface 33. Each of the collimation surfaces 11, 21, 31 defines a collimation path P1*a*, P2*a*, P3*a* inside of the light-combining lens 100. The reflection surfaces 12, 22, 32 are respectively located at the collimation paths P1*a*, P2*a*, P3*a*. The reflection surfaces 12, 22, 32 are arranged along an arrangement direction D1 and are parallel to each other. Each of the reflection surfaces 12, 22, 32 and the corresponding collimation path P1*a*, P2*a*, P3*a* have an acute angle therebetween and jointly define a reflection path P1*b*, P2*b*, P3*b*. The light emergent surface 33 is located at the arrangement direction D1.

Moreover, the reflection paths P1*b*, P2*b*, P3*b* defined by the reflection surfaces 12, 22, 32 are overlapped with each other in the light-combining lens 100 so as to jointly define a light-combining path P0. The light-combining path P0 passes through two of the reflection surfaces 22, 32 that allow light to pass therethrough by traveling along the light-combining path P0, and the light-combining path P0 extends outside of the light-combining lens 100 from the light emergent surface 33.

The above description describes the structure of the light-combining lens 100. The following description describes the structure of the laser module 200, and the connection relationship between the laser module 200 and the light-combining lens 100, but the present disclosure is not limited thereto.

The laser module 200 includes a substrate 201, three laser emitters 202 mounted on the substrate 201, and a fixing mechanism 203. Each of the three laser emitters 202 has a light emitting surface 2021, and the three laser emitters 202 in the present embodiment are configured to emit lights having different colors (e.g., a red laser light, a green laser light, and a blue laser light), but the present disclosure is not limited thereto. In addition, the reflection surfaces 12, 22, 32 in the present embodiment can be optically coating films that are respectively capable of reflecting the lights emitted from the three laser emitters 202, but the present disclosure is not limited thereto. For example, in other embodiments of the present disclosure, each of the reflection surfaces 12, 22, 32 can be formed on the corresponding positions of the light-combining lens 100 in an adhering manner or a grinding manner.

Moreover, any two of the light emitting surfaces 2021 have a step difference therebetween in the incident direction D2, and (the light emitting surfaces 2021 of) the three laser emitters 202 respectively face toward the front collimation surface 11, the expanding collimation surface 21, and the rear collimation surface 31. The light-combining lens 100 and each of the three laser emitters 202 have a separation distance therebetween, the separation distances corresponding to the three laser emitters 202 are different from each other, and any one of the separation distances is smaller than the focal length of any one of the front collimation surface 11, the expanding collimation surface 21, and the rear collimation surface 31.

In the present embodiment, the laser emitter 202 configured to emit the red laser light faces toward the front collimation surface 11 and corresponds to a smallest one of the separation distances, and the laser emitter 202 configured to emit the blue laser light faces toward the rear collimation surface 31 and corresponds to a largest one of the separation distances, but the present disclosure is not limited thereto. For example, in other embodiments of the present disclosure, the positions of the three laser emitters 202 can be changed according to design requirements.

Specifically, the structural design of the light-combining lens 100 in the present embodiment can be applied to the laser module 200 that is miniaturized. For example, a distance between any two of the light emitting surfaces 2021 adjacent to each other is preferably less than or equal to 50% of the focal length of any one of the front collimation surface 11, the expanding collimation surface 21, and the rear collimation surface 31, but the present disclosure is not limited thereto.

Moreover, the lights emitted from the three laser emitters 202 can travel along the front collimation path P1*a*, the expanding collimation path P2*a*, the rear collimation path P3*a*, and the light-combining path P0, and then the lights would travel out of the light-combining lens 100 by passing through the light emergent surface 33 so as to be combined to form a light beam. In the present embodiment, the light-combining lens 100 allows the lights emitted from the three laser emitters 202 to be completely overlapped with each other, when the lights travel along the light-combining path P0 to pass through the light emergent surface 33, but the present disclosure is not limited thereto.

In addition, the relative position of the light-combining lens 100 and the three laser emitters 202 can be adjusted in more than one dimension according to design requirements, and then the fixing mechanism 203 (e.g., an adhesive mechanism, a screwing mechanism, or an engaging mechanism) would be used to maintain the relative position of the light-combining lens 100 and the three laser emitters 202.

Second Embodiment

Figure 3:
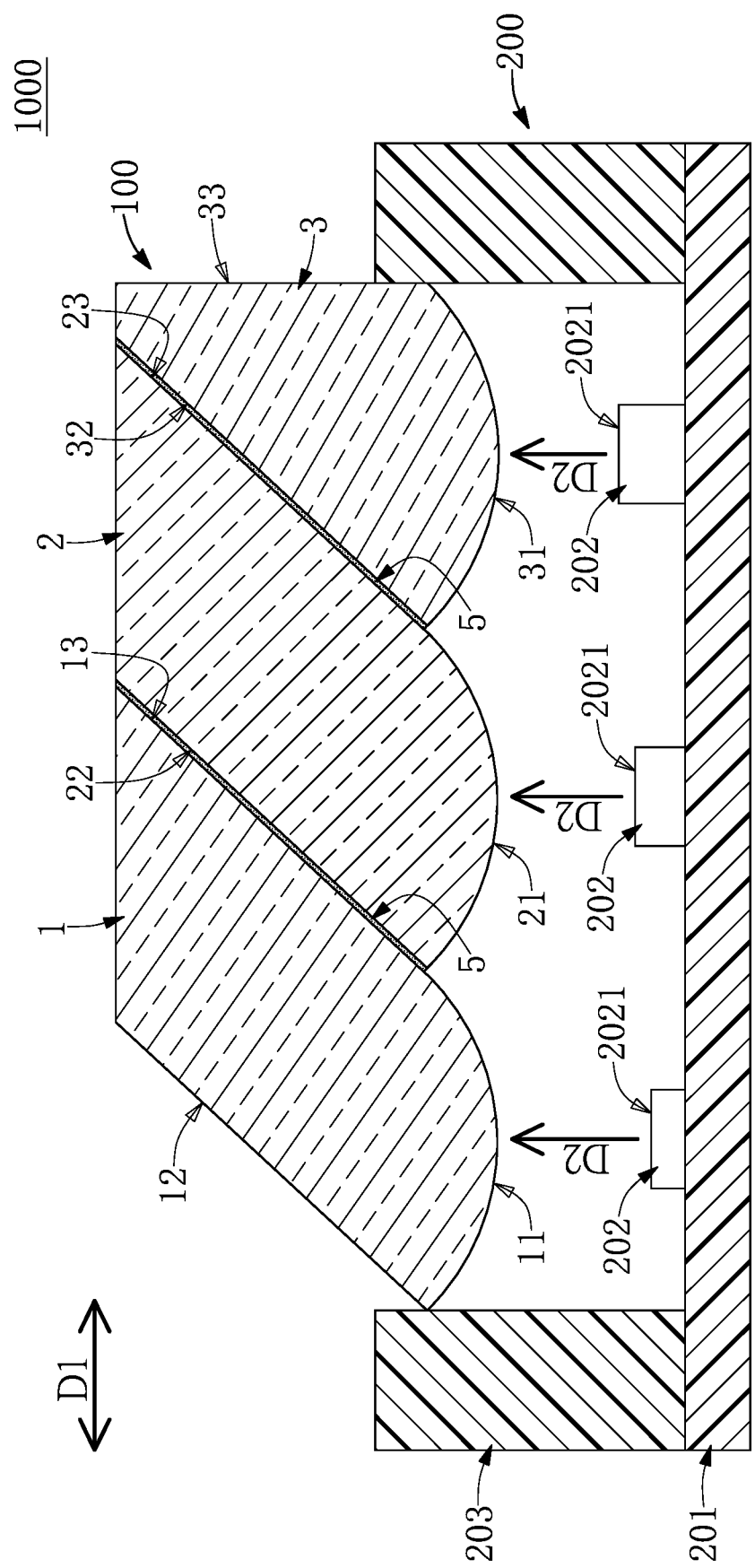
FIG. 3 is a schematic view of a laser projecting device according to a second embodiment of the present disclosure.
Figure 4:
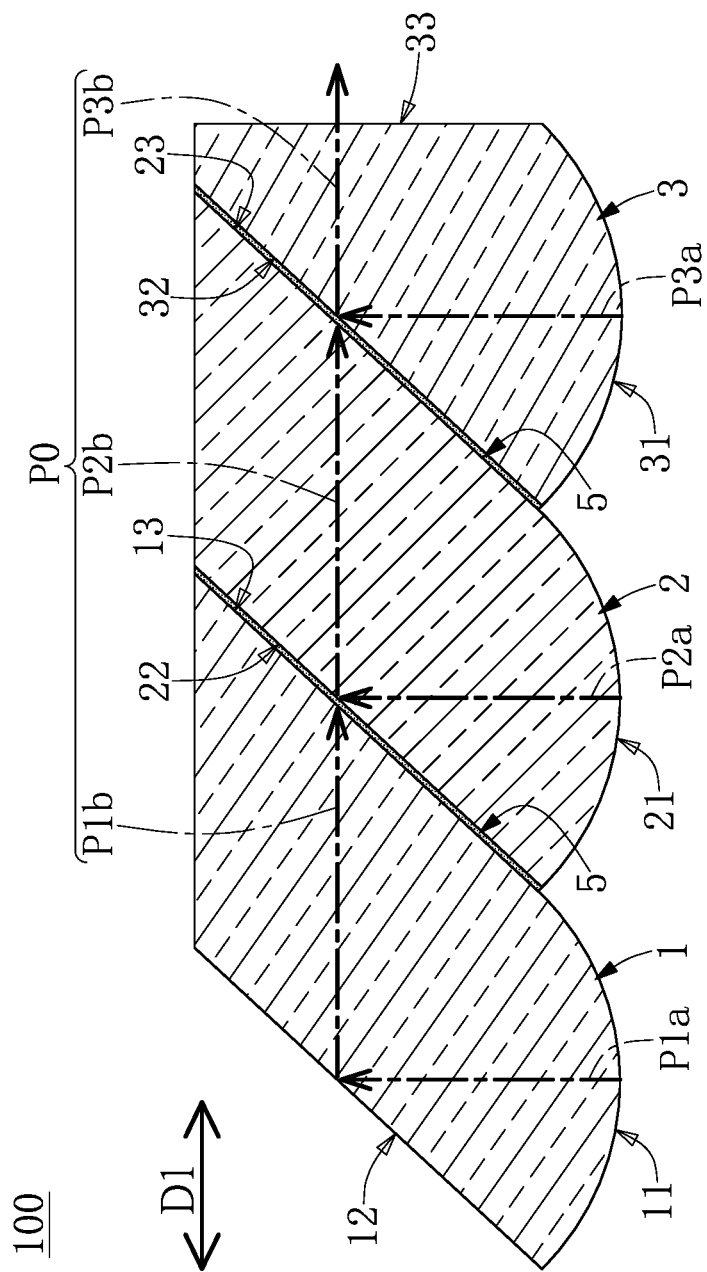
FIG. 4 is a schematic view of a light-combining lens of the laser projecting device according to the second embodiment of the present disclosure.

Referring to FIG. 3 and FIG. 4, a second embodiment of the present disclosure is similar to the first embodiment of the present disclosure. For the sake of brevity, descriptions of the same components in the first and second embodiments of the present disclosure will be omitted herein, and the following description only discloses different features between the first and second embodiments.

In the present embodiment, the light-combining lens 100 does not include the optical colloid 4 of the first embodiment, and is not formed with the slots S of the first embodiment. Furthermore, the light-combining lens 100 in the present embodiment includes two optical adhesive layers 5. The front portion 1, the expanding portion 2, and the rear portion 3 in the present embodiment are made of the same material (e.g., a glass or an optical plastic), and are adhered to each other through the two optical adhesive layers 5 so as to formed a one-piece structure, but the present disclosure is not limited thereto.

Specifically, the front portion 1 has a front combination surface 13 adjacent to the expanding reflection surface 22 (and substantially parallel to the front reflection surface 12), and the front combination surface 13 is gaplessly connected to the expanding reflection surface 22 through one of the two optical adhesive layers 5. Furthermore, the expanding portion 2 has an expanding combination surface 23 adjacent to the rear reflection surface 32 (and substantially parallel to the expanding reflection surface 22), and the expanding combination surface 23 is gaplessly connected to the rear reflection surface 32 through another one of the two optical adhesive layers 5.

Moreover, a thickness of any one of the two optical adhesive layers 5 is less than or equal to 20 μm, and any one of the two optical adhesive layers 5 in the present embodiment can have a nanoscale thickness, but the present disclosure is not limited thereto. Each of the two optical adhesive layers 5 has a second refractive index, and a difference between the first refractive index and the second refractive index is less than 0.2. Accordingly, when the light-combining lens 100 is applied to a light-combining process for combining lights, the lights would travel in a medium (i.e., the light-combining lens 100) having a difference of refractive indexes therein that is less than 0.2, thereby effectively increasing the efficiency and the accuracy of the light-combining process. Furthermore, the thickness of each of the two optical adhesive layers 5 is extremely thin, so that a proportion of the two optical adhesive layers 5 in the light-combining path P0 is extremely low (e.g., being less than 1%). Accordingly, the two optical adhesive layers 5 almost cannot affect the lights in the light-combining process, thereby further increasing the efficiency and the accuracy of the light-combining process.

Third Embodiment

Figure 5:
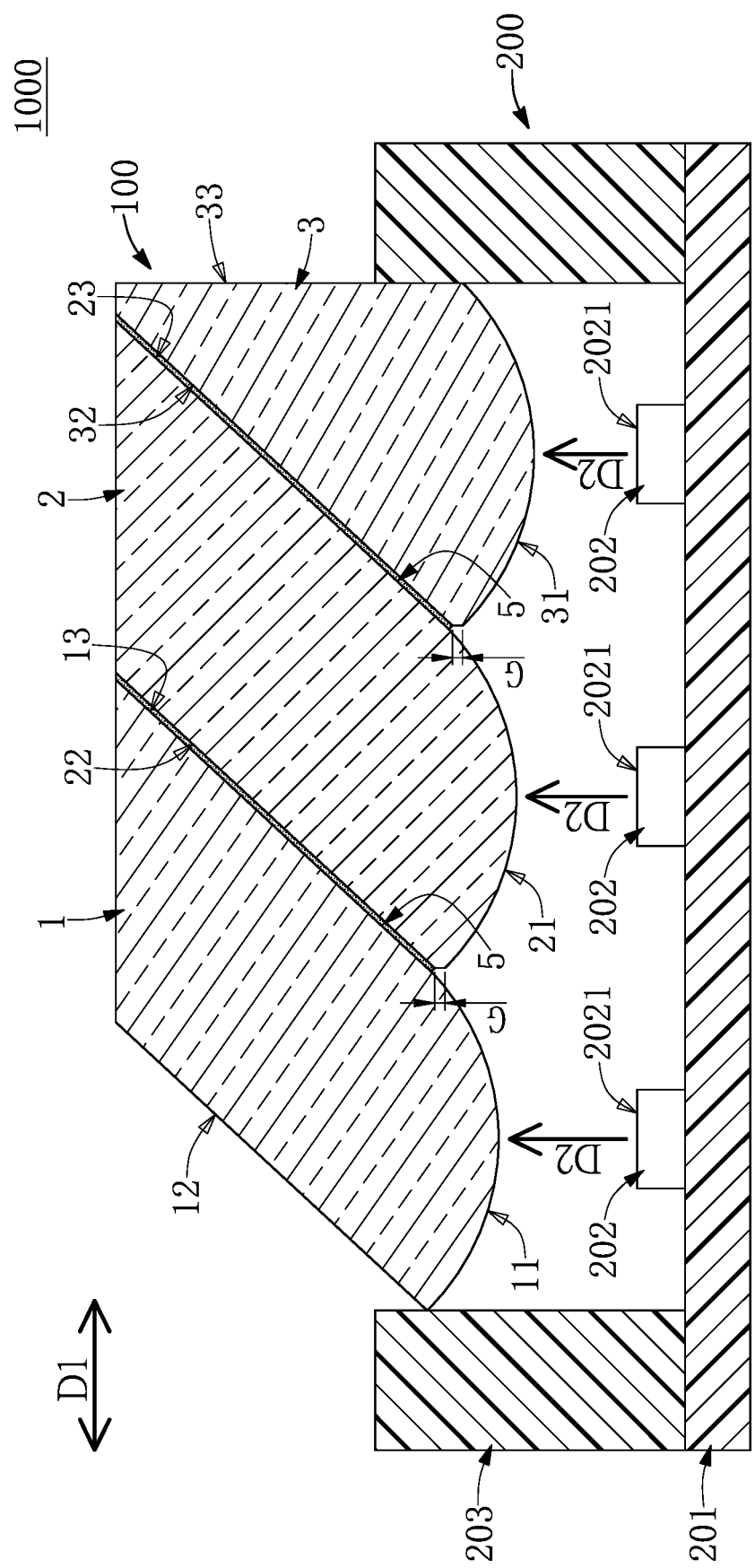
FIG. 5 is a schematic view of a laser projecting device according to a third embodiment of the present disclosure.
Figure 6:
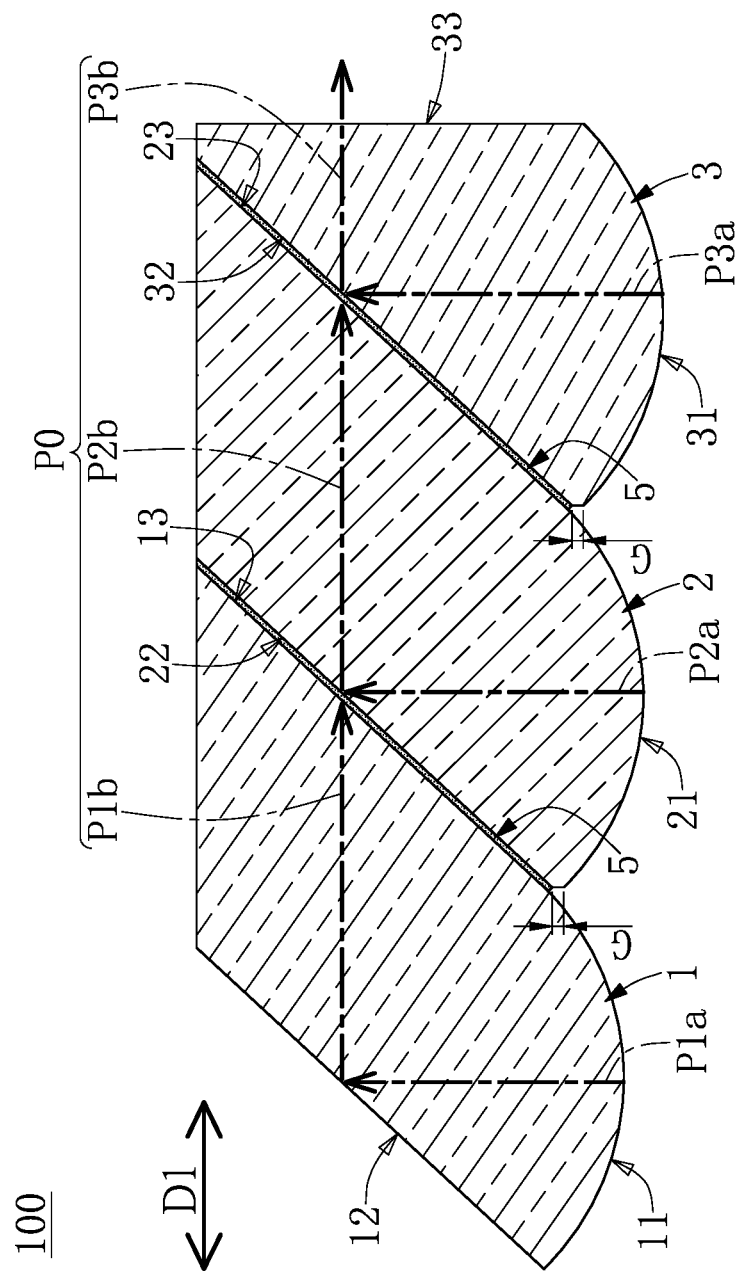
FIG. 6 is a schematic view of a light-combining lens of the laser projecting device according to the third embodiment of the present disclosure.

Referring to FIG. 5 and FIG. 6, a third embodiment of the present disclosure is similar to the second embodiment of the present disclosure. For the sake of brevity, descriptions of the same components in the second and third embodiments of the present disclosure will be omitted herein, and the following description only discloses different features between the second and third embodiments.

In the present embodiment, the light emitting surfaces 2021 of the three laser emitters 202 are coplanar with each other, and any two of the front collimation surface 11, the expanding collimation surface 21, and the rear collimation surface 31 have a step difference G therebetween in the incident direction D2. Specifically, since lights emitted from the three emitters 202 have different wavelengths, the front collimation surface 11, the expanding collimation surface 21, and the rear collimation surface 31 need to be respectively spaced apart from the light emitting surfaces 2021 by different separation distances. However, it is difficult to control, as in the second embodiment, the different separation distances by adjusting the light emitting surfaces 2021. Accordingly, the different separation distances of the laser projecting device 1000 in the present embodiment are controlled by the light emitting surfaces 2021 being coplanar with each other and the light-combining lens 100 having the step differences G, so as to facilitate the manufacturing of the laser projecting device 1000.

In conclusion, as the light-combining lens in the present disclosure is a one-piece structure and has a difference of refractive indexes therein that is less than 0.2, when the light-combining lens is applied to a light-combining process for combining lights, the lights would travel in a medium (i.e., the light-combining lens) having a difference of refractive indexes therein that is less than 0.2, thereby effectively increasing the efficiency and the accuracy of the light-combining process. Moreover, the light-combining lens that is formed as a one-piece structure is effectively reduced in its overall volume, and is therefore capable of being applied to the laser module that is miniaturized.

Moreover, the light-combining lens in the present disclosure can be effectively formed as a one-piece structure having the difference of refractive indexes less than 0.2 by using the optical colloid or the optical adhesive layers to cooperate with the front portion, the expanding portion, and the rear portion, and to cooperate with the structural design of the light-combining lens (e.g., the optical colloid being filled in the slots defined by the front portion, the expanding portion, and the rear portion that are integrally connected to each other; or, the front portion, the expanding portion, and the rear portion being gaplessly connected to each other through the two optical adhesive layers).

Specifically, the thickness of each of the two optical adhesive layers in the present disclosure is extremely thin, so that a proportion of the two optical adhesive layers in the light-combining path is extremely low (e.g., being less than 1%). Accordingly, the two optical adhesive layers almost cannot affect the lights in the light-combining process, thereby further increasing the efficiency and the accuracy of the light-combining process.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A laser projecting device comprising:
   a light-combining lens formed as a one-piece structure and having a difference of refractive indexes therein that is less than 0.2, wherein the light-combining lens includes:
      a front portion including:
         a front collimation surface defining a front collimation path inside of the front portion; and
         a front reflection surface located at the front collimation path, wherein the front collimation path and the front reflection surface have a first acute angle therebetween and jointly define a front reflection path;
      a rear portion including:
         a rear collimation surface defining a rear collimation path inside of the rear portion;
         a rear reflection surface located at the rear collimation path, wherein the rear collimation path and the rear reflection surface have a second acute angle therebetween and jointly define a rear reflection path, and wherein the rear reflection surface allows light to pass therethrough from one side of the rear reflection surface that is opposite to the rear reflection path; and
         a light emergent surface arranged on a surface of the rear portion away from the front reflection surface; and
      an expanding portion disposed between the front portion and the rear portion along an arrangement direction, wherein the expanding portion includes:
         an expanding collimation surface defining an expanding collimation path inside of the expanding portion; and
         an expanding reflection surface located at the expanding collimation path, wherein the expanding collimation path and the expanding reflection surface have a third acute angle therebetween and jointly define an expanding reflection path, and wherein the expanding reflection surface allows light to pass therethrough from one side of the expanding reflection surface that is opposite to the expanding reflection path;
      wherein the front reflection path, the expanding reflection path, and the rear reflection path are overlapped with each other in the light-combining lens so as to jointly define a light-combining path that extends outside of the light-combining lens from the light emergent surface; and
   a laser module corresponding in position to the light-combining lens and including:
      a substrate; and
      three laser emitters mounted on the substrate and respectively facing toward the front collimation surface, the rear collimation surface, and the expanding collimation surface, wherein the three laser emitters are configured to respectively emit lights traveling along the front collimation path, the expanding collimation path, the rear collimation path, and the light-combining path;
   wherein the light-combining lens and each of the three laser emitters have a separation distance therebetween, the separation distances corresponding to the three laser emitters are different from each other, and any one of the separation distances is smaller than a focal length of any one of the front collimation surface, the rear collimation surface, and the expanding collimation surface;
   wherein the front portion and the rear portion have a first refractive index, wherein at least one slot is formed in a region of the light-combining lens between the rear reflection surface and the front portion, wherein the at least one slot has two non-parallel surfaces and is filled with an optical colloid having a second refractive index different than the first refractive index, and wherein the light-combing path goes through the optical colloid in the at least one slot.

2. The laser projecting device according to claim 1, wherein the front portion, the rear portion, and the expanding portion are integrally connected to each other so as to be formed as a one-piece structure, and a quantity of the at least one slot is more than one, wherein any two of the front portion, the rear portion, and the expanding portion have one of the slots arranged in a region thereof through which the light-combining path passes, and wherein the slots are filled with the optical colloid.

3. The laser projecting device according to claim 2, wherein the expanding portion have the first refractive index, and a difference between the first refractive index and the second refractive index is less than 0.2.

4. The laser projecting device according to claim 1, wherein the front reflection surface does not allow any light to pass therethrough from one side of the front reflection surface that is opposite to the front reflection path, and wherein the front reflection surface, the expanding reflection surface, and the rear reflection surface are arranged in one row along the arrangement direction and are parallel to each other.

5. The laser projecting device according to claim 1, wherein the focal length of any one of the front collimation surface, the rear collimation surface, and the expanding collimation surface is within a range of 1.7 mm to 4.5 mm.

6. The laser projecting device according to claim 1, wherein the light-combining lens allows the lights emitted from the three laser emitters to be completely overlapped with each other when the lights travel along the light-combining path to pass through the light emergent surface.

7. The laser projecting device according to claim 1, wherein each of the front collimation surface, the expanding collimation surface, and the rear collimation surface is a convex surface.

8. The laser projecting device according to claim 1, wherein any two of the front collimation surface, the expanding collimation surface, and the rear collimation surface do not have any step difference in an incident direction perpendicular to the arrangement direction.

9. The laser projecting device according to claim 1, wherein the first acute angle, the second acute angle, and the third acute angle have a same value.

10. A light-combining lens formed as a one-piece structure and having a difference of refractive indexes therein that is less than 0.2, the light-combining lens comprising:
    a front portion including:
       a front collimation surface defining a front collimation path inside of the front portion; and
       a front reflection surface located at the front collimation path, wherein the front collimation path and the front reflection surface have a first acute angle therebetween and jointly define a front reflection path; and a rear portion, wherein the rear portion and the front portion are arranged along an arrangement direction, and the rear portion includes:
- a rear collimation surface defining a rear collimation path inside of the rear portion;
- a rear reflection surface located at the rear collimation path, wherein the rear collimation path and the rear reflection surface have a second acute angle therebetween and jointly define a rear reflection path, and wherein the rear reflection surface allows light to pass therethrough from one side of the rear reflection surface that is opposite to the rear reflection path; and
- a light emergent surface arranged on a surface of the rear portion away from the front reflection surface;

wherein the front reflection path and the rear reflection path are overlapped with each other in the light-combining lens so as to jointly define a light-combining path that extends outside of the light-combining lens from the light emergent surface;

wherein the front portion and the rear portion have a first refractive index, wherein at least one slot is formed in a region of the light-combining lens between the rear reflection surface and the front portion, wherein the at least one slot has two non-parallel surfaces and is filled with an optical colloid having a second refractive index different than the first refractive index, and wherein the light-combing path goes through the optical colloid in the at least one slot.

11. The light-combining lens according to claim 10, further comprising at least one expanding portion disposed between the front portion and the rear portion along the arrangement direction, wherein the at least one expanding portion includes:
- an expanding collimation surface defining an expanding collimation path inside of the expanding portion; and
- an expanding reflection surface located at the expanding collimation path, wherein the expanding collimation path and the expanding reflection surface have a third acute angle therebetween and jointly define an expanding reflection path, and wherein the expanding reflection surface allows light to pass therethrough from one side of the expanding reflection surface that is opposite to the expanding reflection path;

wherein the expanding reflection path defined by the at least one expanding portion is overlapped with the front reflection path and the rear reflection path so as to jointly define the light-combining path.

12. The light-combining lens according to claim 11, wherein the front portion, the rear portion, and the at least one expanding portion are integrally connected to each other so as to be formed as a one-piece structure, and a quantity of the at least one slot is more than one, wherein any two of the front portion, the rear portion, and the at least one expanding portion adjacent to each other have one of the slots arranged in a region thereof through which the light-combining path passes, and wherein the slots are filled with the optical colloid.

13. The light-combining lens according to claim 11, wherein each of the front collimation surface, the expanding collimation surface, and the rear collimation surface is a convex surface.

14. The light-combining lens according to claim 11, wherein any two of the front collimation surface, the expanding collimation surface, and the rear collimation surface do not have any step difference in an incident direction perpendicular to the arrangement direction.

15. The light-combining lens according to claim 11, wherein the first acute angle, the second acute angle, and the third acute angle have a same value.

16. The light-combining lens according to claim 10, wherein the front collimation surface and the rear collimation surface have a same focal length that is within a range of 1.7 mm to 4.5 mm.

17. A light-combining lens formed as a one-piece structure and having a difference of refractive indexes therein that is less than 0.2, the light-combining lens comprising:
- a plurality of collimation surfaces each defining a collimation path inside of the light-combining lens;
- a plurality of reflection surfaces respectively located at the collimation paths, wherein the reflection surfaces are arranged along an arrangement direction and are parallel to each other, wherein each of the reflection surfaces and one of the collimation paths corresponding thereto have an acute angle therebetween and jointly define a reflection path, wherein the reflection paths defined by the reflection surfaces are overlapped with each other in the light-combining lens so as to jointly define a light-combining path, and wherein the light-combining path passes through at least one of the reflection surfaces that allows light to pass therethrough by traveling along the light-combining path; and
- a light emergent surface located at the arrangement direction, wherein the light-combining path extends outside of the light-combining lens from the light emergent surface;

wherein the collimation surfaces, the reflection surfaces, and the light emergent surface are arranged on at least two portions of the light-combining lens that have a first refractive index, wherein at least one slot is formed in a region of the light-combining lens between the at least two portions, wherein the at least one slot has two non-parallel surfaces and is filled with an optical colloid having a second refractive index different than the first refractive index, and wherein the light-combing path goes through the optical colloid in the at least one slot.

18. The light-combining lens according to claim 17, wherein the collimation surfaces have a same focal length that is within a range of 1.7 mm to 4.5 mm.

19. The light-combining lens according to claim 17, wherein any two of the collimation surfaces do not have any step difference in an incident direction perpendicular to the arrangement direction.

20. The light-combining lens according to claim 17, wherein each of the collimation surfaces is a convex surface.

* * * * *